United States Patent [19]

Loubier

[11] 3,872,334
[45] Mar. 18, 1975

[54] INTEGRAL ROTOR AND GEAR ASSEMBLY

[76] Inventor: Robert J. Loubier, 3111 Covington Rd., Fort Wayne, Ind. 46704

[22] Filed: Apr. 18, 1974

[21] Appl. No.: 461,904

Related U.S. Application Data

[62] Division of Ser. No. 244,130, April 14, 1972, Pat. No. 3,842,148.

[52] U.S. Cl. .................. 310/43, 310/44, 310/83, 310/156, 310/261, 335/303
[51] Int. Cl. ........................................... H02k 7/10
[58] Field of Search .......... 300/42, 43, 44, 83, 261, 300/156; 29/152; 335/303; 58/23 D

[56] References Cited
UNITED STATES PATENTS

| 3,024,392 | 3/1962 | Baermann | 335/303 |
|---|---|---|---|
| 3,158,988 | 12/1964 | Walmer | 58/23 D |
| 3,175,110 | 3/1965 | Kohlhagen | 310/83 |
| 3,231,770 | 1/1966 | Hyde | 310/156 |
| 3,475,630 | 10/1969 | Heinzen et al. | 310/156 X |
| 3,600,633 | 8/1971 | Bellis | 310/83 X |
| 3,602,750 | 8/1971 | Boyer | 310/44 X |
| 3,728,786 | 4/1973 | Lucas et al. | 310/156 X |
| 3,746,900 | 7/1973 | Morley | 310/156 X |

Primary Examiner—Donovan F. Duggan

[57] ABSTRACT

An integral rotor assembly for a dynamoelectric machine fabricated of a mixture of thermoplastic powder and barium ferrite particles in such proportion that the finished assembly has predetermined physical and magnetic strengths. Typically, a gear is molded as an integral part of a magnetic rotor permanently magnetized. The gear is for the purpose of transmitting motive force. Such an assembly is molded as a single part containing orientable, permanently magnetizable particles, such as barium ferrite, in a thermoplastic matrix. The magnetic particles are oriented to maximize magnetic strength and there is sufficient plastic material to provide the necessary structural strength in the gear.

10 Claims, 5 Drawing Figures

INTEGRAL ROTOR AND GEAR ASSEMBLY

This is a divisional of application Ser. No. 244,130 filed Apr. 14, 1972, now U.S. Pat. No. 3,842,148.

BACKGROUND OF THE INVENTION

Electric synchronous timing motors conventionally employ a rotor assembly which comprises an annular, permanently magnetized rotor, and a combination shaft and gear physically connected thereto. The annular rotor is fabricated conventionally of ceramic-magnetic materials which the shaft and gear parts are of thermoplastic material molded thereabout. The rotor material may be of ceramic powder and binder, wherein the binder is of minimal percentage, providing a suitable magnet having little or no physical strength. The necessary structural strength is provided by the plastic material molded thereabout.

Such a two-part assembly is relatively expensive to fabricate because of the different processing steps involved. Furthermore, in molding a plastic part to the ceramic magnet, breakage due to the frangibility of the magnet may occur. Since such ceramic magnets are indeed delicate and fragile, they must be handled with extreme care before and during the molding operation.

In such prior art assembly, the ceramic magnet provides the magnetic structure of the rotor whereas the plastic provides the physical or structural strength whereby motive force may be transmitted to or from the magnet. since the material of which the magnet is fabricated is fragile, it is not suitable for use as the functioning gear or shaft parts of the assembly, the plastic material providing the necessary structural strength for this purpose. Furthermore, even if the ceramic part were strong enough, the material thereof cannot be molded to precise enough dimensions for the complex shapes of the usual rotors.

SUMMARY OF THE INVENTION

The present invention relates to an improvement in a rotor assemblies for electrodynamic machines, and more particularly to an integrated rotor assembly composed of a permanently magnetized rotor and functional machine parts that are conventionally secured thereto.

In accordance with this invention, there is provided for use in a dynamoelectric machine, an integral rotor assembly comprising a permanently magnetized rotor and a force-transmitting element, such as a spur gear, formed of the same material. The material includes a solidified mixture of thermoplastic material and magnetic particles which are capable of being permanently magnetized. Barium ferrite is a typical magnetic material. These magnetic particles in the rotor are magnetically oriented according to a predetermined geometric pattern. The thermoplastic serves as a holding matrix for the magnetic particles and also provides structural strength for the assembly. The particles are homogeneously distributed throughout the assembly except as modified by the aforesaid orientation. The quantity of said particles in the assembly are sufficient to provide the rotor with a predetermined magnetic strength with the particles oriented as aforesaid, and the quantity of the thermoplastic in the assembly is sufficient to provide the predetermined structural strength for the assembly and in particular for the transmission of motive force to or from the rotor.

In the event the force-transmitting element is a spur gear, it is obvious that the gear must be strong enough to transmit motive force.

It is an object of this invention to provide a rotor assembly for a dynamoelectric machine in which two or more functioning parts, combined in an integrated assembly, are formed of the same material, at least one of these parts requiring a predetermined structural strength and the other a predetermined magnetic strength.

It is still another object of this invention to provide a rotor assembly which is simple in construction, economical to manufacture, and efficient in operation.

The above mentioned and other features and objects of this invention and the manner of attaining them will become more apparent and the invention itself will be best understood by reference to the following description of an embodiment of the invention taken in conjunction with the accompanying drawings.

Figure 1:
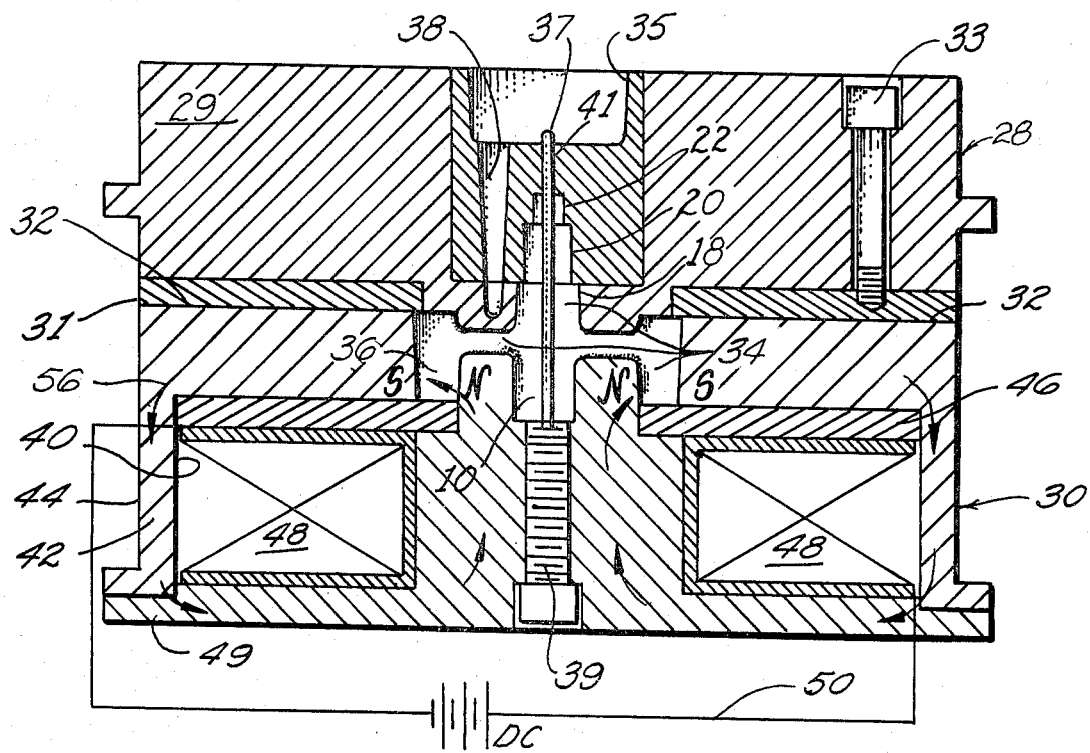
FIG. 1 is a cross-section of a typical mold apparatus used in connection with fabricating a rotor assembly of this invention.
Figure 2:
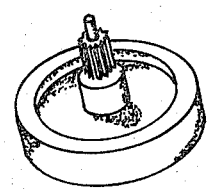
FIG. 2 is a perspective view of a typical rotor assembly of this invention.
Figure 5:
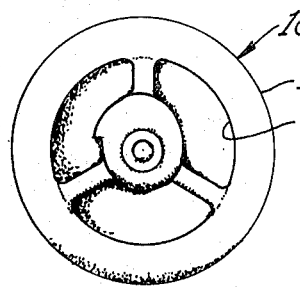
FIGS. 3, 4, and 5 are respectively, side, front, and rear views of the rotor assembly of FIG. 2.
Figure 4:
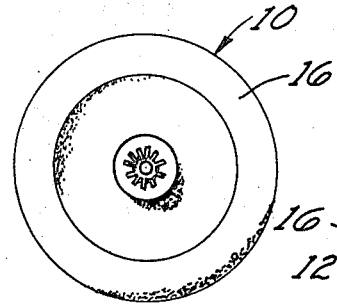
Figure 3:
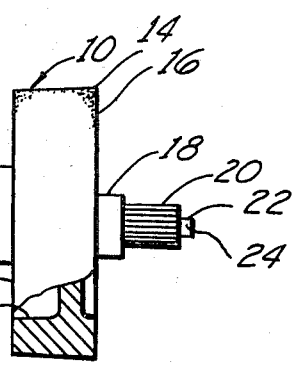

Referring to the drawings, and more particularly to FIGS. 2 through 5, a typical rotor assembly of this invention for use in a conventional electric, synchronous-timing motor is shown. This assembly includes as parts of the rotor assembly the permanently magnetized, annular rotor 10 of cylindrical shape defined by inner and outer coaxial peripheral surfaces 12 and 14, respectively, as shown. As an integral part of the rotor 10 is a discshaped support 16 provided with a central hub 18, a spur gear 20 and a shaft portion 22. All these parts are integrally molded together in a single unit or assembly, a shaft opening being provided therethrough for receiving a supporting axle about which the rotor assembly just described rotates.

The assembly as a whole has the necessary physical strength to function properly in a synchronous-timing motor. Furthermore, it has the necessary magnetic strength to function efficiently as a conventional rotor.

This rotor assembly is fabricated preferably by injection molding a mixture of essentially two ingredients, one a thermoplastic material and the other magnetic particles of the type which may be permanently magnetized, these typically being either isotropic or anisotropic. Typical of the thermoplastic material is polyamide, known in the trade as Nylon, a trademark of E. I. duPont de Nemours Corp.

Typical of the magnetic material is barium ferrite in particle sizes conventionally available. Typical size of such particles may be one to ten microns or courser.

Other plastics and materials for magnetic particles may be used without departing from the spirit and scope of this invention provided the necessary strength and functional properties as will become apparent from the following description are present.

The rotor assembly of FIGS. 2 through 5 has an additional part integrally molded therewith in the form of a cam 26 spaced inwardly from the inner rotor surface 12. While these particular rotor parts have been disclosed, it will become apparent that other functional parts may be used instead without departing from the spirit and scope of this invention.

Now referring to FIG. 1, the method and apparatus of this invention will be described. The rotor assembly is fabricated as a single unit preferably by injection molding. The principal parts of the apparatus employed in this injection molding process is a mold essentially in two sections, these being an upper mold member 28 and a lower mold member 30. Both of these mold members 28 and 30 have parting surfaces 32 which are flat and intimately engageable, these surfaces being interrupted only by the mold cavity indicated generally by the numeral 34. One surface of the disc portion 16 of the rotor is flush with the parting surfaces 32 as shown. The axis of the rotor assembly is positioned normal to the parting surfaces 32, the cylindrical rotor portion 36 of the cavity which forms the rotor part 10 previously described, extending downwardly into the lower mold member 30 as shown. The remaining parts of the cavity which form the hub 18, the spur gear 20 and the shaft part 22, are in the upper mold member 28 as shown. A gate 38 in the mold member 28 communicates with the cavity 34.

The upper mold member 28 is generally in three parts, a non-magnetic body 29, an annular plate 31 of magnetic material suitably bolted thereto by means of a series of bolts 33, and an insert 35 preferably of a durable material such as steel. The insert 35 preferably is press-fitted into a companion cavity in the body 29. In one embodiment, the body 29 is of soft stainless steel while the annular plate 31 is steel. The plate 31 provides a portion of the parting surface of the upper mold member 28.

In the insert 35 is the upper portion of the gate 38 and the cavity parts which form the hub 18, the spur gear 20, and the shaft part 22. As will appear from the description that follows, the body 29 is formed of a non-magnetic material so as to provide a substantial or high reluctance path to the flow of magnetic flux, while the plate 31 is of magnetic material to provide a low reluctance path. Also, the plate 31 is preferably hardened so as to provide a durable parting surface for the upper mold member 28. Similarly, the insert 35 is formed of steel so as to provide greater wear life as compared with the softer stainless steel for repeated engagements of a core pin 37 having an enlarged shank 39 threaded into the lower mold member 30 as shown.

In the lower mold member 30 is an annular cavity 40 concentric with the rotor cavity 36 formed by two mold parts, 42 and 44 suitably secured together by means of bolts (not shown) or clamping plates in a conventional molding machine. The annular cavity 40 has intimately fitted thereinto a coil or solenoid 48 having electrical leads 50. A thin non-magnetic metal disc 46 (stainless steel or the like) separates the bottom of the rotor cavity 36 from the upper surface of the solenoid 48 as shown. All remaining parts of the lower mold member 30 are formed of magnetic material, such as steel, the solenoid 48 in effect being imbedded in a solid steel block represented by the lower mold member 30.

The shank 39 of core pin 37 is fixedly threaded to the mold part 44 as shown that the pin 37 is positioned coaxially with respect to the cavity 34 to be slidably received by bore 41 in insert 35.

The material which is used in forming the rotor assembly in one embodiment of this invention is a mixture of a suitable thermoplastic material, such as polyamide (Nylon), and anisotropic particles of barium ferrite as previously explained. The percentage of these materials in one workable embodiment is 20 percent thermoplastic and 80 percent magnetic particles. This material thoroughly mixed in powdered form is then fed into a conventional injection molding machine. If desired, such powdered material may be extruded and pelletized prior to such injection molding. The mold apparatus of FIG. 1 is mounted in such a machine and the material is injected through the gate 38 into the cavity 36 with the mold halves 28 and 30 closed as shown. While the material is molten in the cavity 34, a suitable DC voltage is applied to the leads 50 to energize the coil 48. A magnetic field is thereby produced which produces unidirectional flux lines in the mold member 30 as indicated by the arrows 56, which pass with maximum density radially through the rotor cavity 36, via the magnetic plate 31 and mold parts 42 and 44, as shown. This results, in effect, in providing annular magnetic poles radially spaced apart on opposite sides of the rotor cavity 36 as indicated by the letters N and S, conventional symbols for North and South magnetic poles. While the plastic is yet molten, this magnetic field orients the magnetic particles in their preferred direction of magnetization. The plastic is permitted to cool and solidify whereupon the mold halves 28 and 30 are separated in a conventional manner to eject the molded part therefrom. Prior to the solidification or shortly thereafter of the plastic, the power applied to the coil 48 may be removed.

By forming the mold body 29 of non-magnetic material, the heavier flux density will pass through the magnetic material on opposite radial sides of the ring cavity 36, and further, the magnetic field will be shunted away from the hub and gear portions of the cavity which need not be magnetized. Not magetized, the gear poprtion 20 will not pick up magnetic particles which could if present interfere with the meshing of gear portion 20 and another gear (not shown) in a synchronous timing motor in which the rotor assembly is mounted.

In the finished product, by reason of the particles in the rotor portion 10 being maagnetically oriented, the rotor may be permanently magnetized according to a predetermined magnetic field pattern, and will possess the required magnetic strength to function properly and efficiently in a conventional synchronous-timing motor. By the same token, a sufficient quantity of thermoplastic is employed in the assembly to serve as a holding matrix and also to impart structural strength whereby the functioning parts 18, 20 and 22 are sufficiently strong to transmit the usual mechanical forces.

The quantities of plastic and magnetic particles used must be balanced one against the other in order to obtain the necessary magnetic and physical strengths as described. By using too little plastic, the finished assembly will have insufficient physical strength to perform the necessary mechanical functions. By the same token, an inadequate quantity of magnetic material will result in magnetic strength properties too small to serve the intended purpose. By utilizing either isotropic or anisotropic magnetic materials, it is possible to maximize the physical and magnetic strength properties whereby an efficient strong rotor assembly may be provided.

Merely utilizing the magnetic and plastic materials as described and injection molding without the application of the magnetic, orienting field will not product the desired result. In order to maximize the quanitity of plastic used, hence physical strength considered, it is necessary that the magnetic materials be of a class which possesses improved magnetic properties when oriented by a magnetic field. Anisotropic materials naturally possess these properties and isotropic materials which comminuted respond favorably to a magnetizing field also to provide these properties. By orienting the permanently magnetizable particles in the rotor portion of the total assembly, it has been found that the quantity of magnetic material may be held to a minimum thereby permitting use of sufficient plastic material for structural strength. The rotor assembly of this invention is an integral part containing at least two components, one providing the magnetic properties, the other the structural strength. Substantial economies are realized in the fact that injection molding is an economical, high-volume production process and the thermoplastic materials are economical. Since this integral assembly of functioning components is formed in a single operation, a quite obvious economic advantage is achieved over the prior art arrangement of fabricating the assembly in two steps, molding a structural support about the ceramic magnetic rotor previously fabricated in a separate operation.

If it is desired to provide alternate North and South poles around the circumference of the rotor 10, it is only necessary to magnetize the rotor in this manner using conventional techniques.

While barium ferrite as a preferred material has been disclosed, other anisotropic materials may be used. Rotors of sufficient but less magnetic strength may be fabricated in the same manner using isotropic magnetic particles instead. Such materials may be oriented by application of the magnetizing field as previously explained, but the magnetic strength in the finished rotor will not be as great with the isotropic as with the anisotropic materials. These magnetic materials are to be contrasted with ordinary iron filings or materials of like properties which are not considered to be suitable in this invention since the desired structural and magnetic strength properties in the minimum-sized assembly are not considered proper.

Plastic materials other than polyamides may be used depending upon the properties desired of the finished product. For example, the addition to a quantity of polytetrafluoroethylene (Teflon) provides lubricity and glass fibers strength. Thermomsetting plastic materials may also be used, again depending upon design preferences or functional requirements of the rotor assembly.

While there have been described above the principles of this invention in connection with specific apparatus, it is to be clearly understood that this description is made only by way of example and not as a limitation to the scope of the invention.

What is claimed is:

1. For use in a dynamoelectric machine, an integral rotor assembly comprising a permanently magnetized rotor and a force-transmitting element formed of the same material, said material including a solidified mixture of thermoplastic and magnetic particles capable of being permanently magnetized, said magnetic particles in said rotor being oriented according to a predetermined magnetic field pattern, said thermoplastic serving as a holding matrix for said particles and also providing structural strength for said assembly, said particles being homogeneously distributed throughout said assembly except as modified by said orientation, the quantity of said particles in said assembly being sufficient to provide said rotor with a predetermined magnetic strength with said particles oriented as aforesaid, and the quantity of said thermoplastic in said assembly being sufficient to provide a predetermined structural strength for said assembly, said structural strength being of a magnitude as provides for the transmission of motive force by said force-transmitting element to or from said rotor.

2. The integral assembly of claim 1 in which said rotor has an annular peripheral portion containing said oriented particles, a coaxial shaft portion integrally joined to said annular portion, said force-transmitting element including said shaft portion.

3. The assembly of claim 2 in which said peripheral portion is cylindrically shaped, said oriented particles being disposed between the peripheral surface thereof and the central portion of said assembly.

4. The rotor assembly of claim 3 in which said peripheral portion has concentric inner and outer cylindrical surfaces spaced radially outwardly from said shaft portion, said oriented particles being disposed between said surfaces, a supporting disc portion integrally joining said shaft portion to said peripheral portion, and a coaxial spur gear integrally joined to said shaft portion.

5. The rotor assembly of claim 4 in which said shaft portion has a coaxial bore, said thermoplastic being lubricous.

6. The rotor assembly of claim 5 in which said thermoplastic includes nylon and said particles include barium ferrite particles.

7. The rotor assembly of claim 4 in which the magnetic particles in said peripheral portion are oriented and the particles in said gear are not oriented.

8. For use in a dynamoelectric machine, an integral rotor assemblly comprising a permanently magnetized rotor and force-transmitting element formed of the same material, said material including a solidified mixture of thermoplastic and magnetic particles capable of being permanently magnetized, said thermoplastic serving as a holding matrix for said particles and also providing structural strength for said assembly, said particles being homogeneously distributed throughout said assembly, the quantity of said particles in said assembly being sufficient to provide said rotor with a predetermined magnetic strength, and the quantity of said thermoplastic in said assembly being sufficient to provide a predetermined structural strength for said assembly, said structural strength being of a magnitude as provides for the transmission of motive force by said force-transmitting elements to or from said rotor.

9. The assembly of claim 8 in which said rotor has an annular peripheral portion containing said particles, said peripheral portion having concentric inner and outer cylindrical surfaces, a radially disposed supporting disc portion integrally joined to said peripheral portion, said disc portion having a thickness less than the axial dimension and offset toward one side of said peripheral portion, a cylindrical hub portion coaxially projecting from one side of said disc portion, and a spur gear of smaller diameter coaxially projecting from said hub portion, said disc portion, said hub portion and said gear also containing said particles.

10. The assembly of claim 8 in which said thermoplastic is a lubricous material, said disc portion, said hub portion and said gear having a coaxial bore therethrough adapted to serve as a journal for a shaft.

* * * * *